L. E. WATERMAN.
DRAFT EQUALIZER.
APPLICATION FILED APR. 11, 1911.
1,170,583.
Patented Feb. 8, 1916.
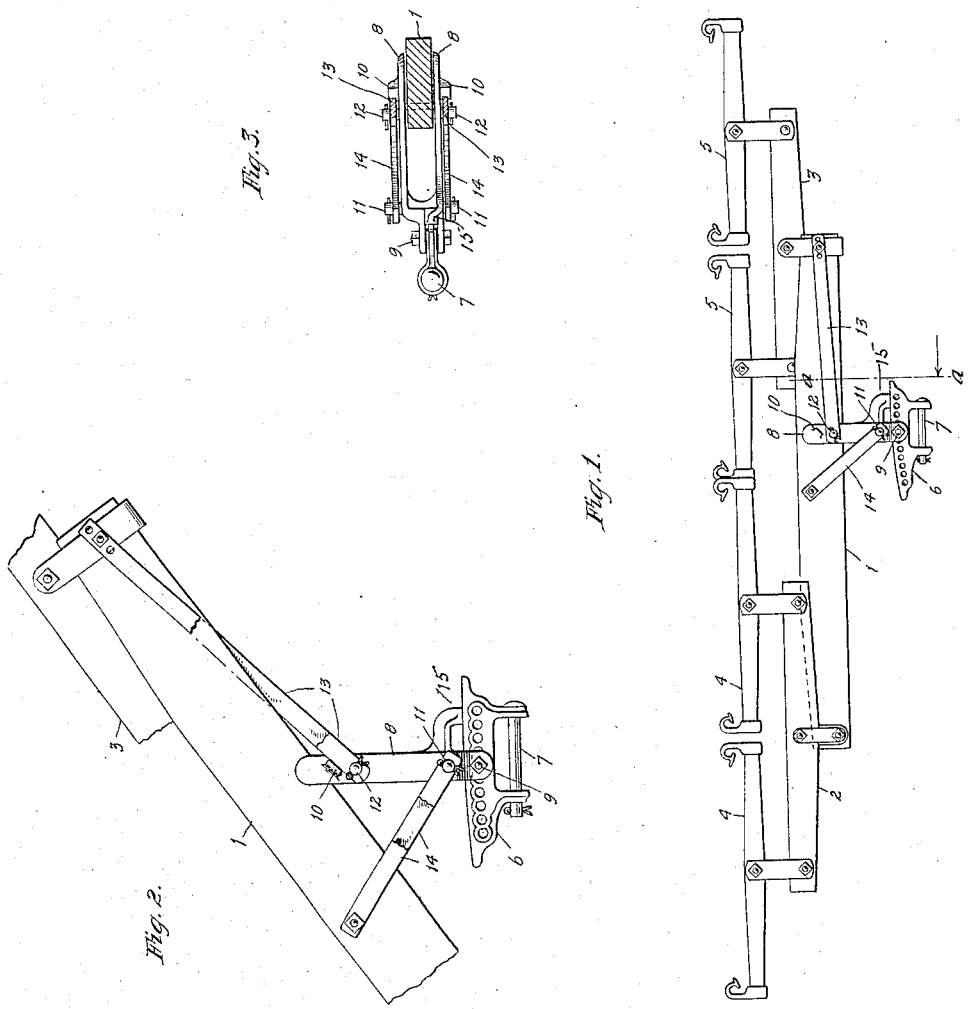
Witnesses:
E. Behel
G. Southworth
Inventor:
Lewis E. Waterman
By A. O. Behel
Atty.

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

DRAFT-EQUALIZER.

1,170,583.   Specification of Letters Patent.   Patented Feb. 8, 1916.

Application filed April 11, 1911. Serial No. 620,419.

*To all whom it may concern:*

Be it known that I, LEWIS E. WATERMAN, a citizen of the United States, residing at Rockford, in the county of Winnebago and State of Illinois, have invented certain new and useful Improvements in Draft-Equalizers, of which the following is a specification.

This invention relates to draft equalizers and has more particular reference to those used with agricultural machinery, especially with gang plows.

One of the primary objects of my invention is to provide improved draft equalizing means particularly adapted for a multi-horse gang plow hitch wherein one horse walks in the furrow and the other horses walk on plowed ground, and wherein the center of hitch on the gang plow is at one side of the center of the horses. This is desirable because the horses can not be hitched in alinement with the gang plow without having one of the horses walk on the plowed ground.

Another object of my invention is to provide a draft equalizer of the above character for pulling obliquely to the line of draft of the gang plow to counteract the side thrust of the plow so as to effect easy draft of the implement.

Another object is to provide a draft-equalizer of the foregoing character in which the evener-bar is connected through an offset draft member to rigid draft means pivotally mounted on a clevis, and to provide means for precluding said rigid draft means from swinging on its clevis pivot to the side of the line of draft opposite the off-set draft means, whereby the evener-bar may swing laterally to both sides of the line of draft and will swing laterally together with said rigid draft means upon the pivot thereof on the clevis toward the offset side of the equalizer means, whereby a very short and quick turn may be made to this side to effect quick and easy turning of the plow at the corners of a field.

I also aim to provide a draft equalizer of improved design for lending simplicity to the construction and operation of the device and for permitting the device to be manufactured at a low cost.

Referring to the drawings: Figure 1 is a plan view of my improved draft equalizer. Fig. 2 is a partial plan view of Fig. 1 showing the evener-bar angled with respect to the line of draft; and Fig. 3 is a sectional view taken on the line $a-a$ of Fig. 1.

By reference to the drawings it will be seen that an evener-bar designated by the reference character 1 has attached thereto a multi-horse hitch 2 comprising doubletrees 2 and 3 pivotally mounted on the ends of the evener-bar and pairs of swingletrees 4 and 5 pivotally mounted on the doubletrees 2 and 3, respectively.

A clevis 6 may be connected to a gang plow or other implement in any suitable manner, such as by means of a bolt connection 7 as shown in the drawings. An evener clevis in the form of a yoked bracket the arms of which are designated by the reference characters 8 is pivotally mounted at its closed end on the clevis 6 on a vertical axis through means of a bolt 9. The evener-bar is interposed between the arms 8 of the yoked bracket and is pivotally connected to said bracket in such manner that it may be moved freely and angled with respect thereto as will be afterward described. This pivotal connection comprises a pair of draft-links 14, pivotally connected at one end to the yoked bracket on studs 11 located forward of the bracket pivot 9 and pivotally connected at their opposite ends to the evener-bar centrally intermediate the ends thereof. A pair of links 13 pivotally connected at one end to the studs 12 on the yoked bracket, are pivotally connected at their opposite ends to an end portion of the evener-bar in such manner as to hold the evener-bar draft-link pivot offset to one side of the yoked bracket as is clearly shown in Fig. 1. The yoked bracket is provided at its side opposite the draft-link 14 and adjacent to its pivoted end with a lateral extension or stop 15 adapted to abut against the clevis 6, as shown in Fig. 1, to preclude the yoked bracket from swinging toward the side of the line of draft opposite that of the offset draft connection.

When the draft is applied to the evener-bar the tendency is to swing the same laterally to aline the draft-links 14 with the yoked bracket, which movement is precluded by the links 13, which hold the evener-bar in its offset position. Because of the oblique position of said draft-links 14, the tendency of the draft will be to swing the yoked bracket to the right, viewing Fig. 1, on its pivot 9, which movement is precluded by the stop 15. Thus with the draft straight ahead the operative position of the various draft members will be as shown in Fig. 1, wherein the center of hitch on the evener-bar is offset to one side of the center of hitch on the gang plow to properly position the horses with respect to the plowed land. Should the horses hitched to the swingletrees 5 outpull to a great degree those hitched to the swingletrees 4 the result would be the swinging of the evener-bar in the manner shown in Fig. 2 until the links 13 abut the stops 10 formed rigidly on the bracket arms 8.

From the foregoing it is obvious that the evener-bar may swing laterally to both sides of the yoked bracket upon the pivots 11 and 12. The evener-bar might be so moved when turning the horses toward either side of the line of draft, but when making a right-angle turn to turn the gang plow at a corner of a field it is desirable that the evener-bar be swung quickly from a pivot close to the gang plow in as great an arc as possible in order that the gang plow may be quickly and easily turned. This is effected by the yoked bracket being pivoted to the clevis and swung bodily when making such a turn, the stop 15 being withdrawn from the clevis 6, to give the evener-bar as large a range of swinging movement as possible.

I claim:

In a draft equalizer, the combination of an evener clevis pivotally mounted so as to swing laterally with respect to an implement or vehicle to which it may be attached and shaped at its forward end to form a yoke, the arms of which are vertically spaced, an evener-bar interposed between said arms so as to be slidingly movable therebetween, links pivotally mounted therefrom in opposite directions and being so pivotally connected to the evener bar as to maintain the same offset laterally to one side of the evener clevis and permit the evener bar to swing laterally on its evener clevis pivots, guided at all times between the yoke arms of the clevis, and an abutment member rigid with the evener clevis and arranged to so abut against a part fixed with respect thereto as to prevent swinging of the evener clevis to the side of the medial line of the load opposite from that to which the evener bar is offset, whereby a relatively close hitch is obtained and the links are relieved of the weight of the evener bar and its draft attachments by reason of the association of the evener bar with the yoked evener clevis, and whereby also the evener bar may be swung to its offset side on both the pivots of its links and the evener clevis pivot so as to make possible a short, quick turn at an abrupt angle.

In testimony whereof I have hereunto set my hand in presence of two subscribing witnesses.

LEWIS E. WATERMAN.

Witnesses:
A. O. BEHEL,
E. D. E. N. BEHEL.

Copies of this patent may be obtained for five cents each, by addressing the "Commissioner of Patents, Washington, D. C."